United States Patent
Kim et al.

(10) Patent No.: US 7,620,300 B2
(45) Date of Patent: *Nov. 17, 2009

(54) METHOD FOR CREATING AND MANAGING NAVIGATION INFORMATION IN A REWRITABLE RECORDING MEDIUM

(75) Inventors: Byung-Jin Kim, Kyunggido (KR); Kang-Soo Seo, Kyunggido (KR); Ki-Won Kang, Seoul (KR)

(73) Assignee: LG Electronics, Inc., Seoul (KR)

( * ) Notice: Subject to any disclaimer, the term of this patent is extended or adjusted under 35 U.S.C. 154(b) by 1099 days.

This patent is subject to a terminal disclaimer.

(21) Appl. No.: 10/371,129

(22) Filed: Feb. 20, 2003

(65) Prior Publication Data

US 2004/0225630 A1    Nov. 11, 2004

Related U.S. Application Data (63) Continuation of application No. 09/846,802, filed on Apr. 30, 2001, now Pat. No. 6,631,387, which is a continuation of application No. 09/245,857, filed on Feb. 8, 1999, now Pat. No. 6,301,587.

(30) Foreign Application Priority Data

Aug. 18, 1998    (KR) .................................. 98-33856

(51) Int. Cl.
H04N 5/00 (2006.01)
H04N 7/26 (2006.01)

(52) U.S. Cl. ...................................... 386/125; 386/109

(58) Field of Classification Search ................. 386/124, 386/125, 45, 46, 55, 68, 104, 105, 106
See application file for complete search history.

(56) References Cited

U.S. PATENT DOCUMENTS 5,596,564 A    1/1997    Fukushima et al.
5,619,338 A    4/1997    Nakai et al.

(Continued)

FOREIGN PATENT DOCUMENTS

JP    07-334977    12/1995

(Continued)

*Primary Examiner*—Robert Chevalier
(74) *Attorney, Agent, or Firm*—Birch, Stewart, Kolasch & Birch, LLP (57) ABSTRACT

This invention provides a method of managing the navigation data for a rewritable recording medium which are referred to for control of recording, editing, and reproduction. It enables to access to each information table in the navigation data directly by referring to the start address, which is kept in the first information table in the navigation data. When data are recorded to the rewritable recording medium, the management data which are relevant to the data to be recorded are created and written to the relevant information tables, which are accessed directly based on the start addresses. When data on the recording medium are reproduced, the information tables which contain management data required for reproduction of the requested data are located directly by the start addresses. Then, the data are read out from the rewritable recording medium and reproduced in reference to the management data. Compared to the prior navigation data structure, where the information tables are accessed through calculation of the end addresses, the present invention allows to reduce the access time to each information table, contributing to the real-time operation for writing and reproduction.

20 Claims, 7 Drawing Sheets

U.S. PATENT DOCUMENTS

| | | | |
|---|---|---|---|
| 5,745,645 A | 4/1998 | Nakamura et al. | |
| 5,764,846 A | 6/1998 | Hirayama et al. | |
| 5,778,142 A | 7/1998 | Taira et al. | |
| 5,793,872 A | 8/1998 | Hirayama et al. | |
| 5,799,212 A | 8/1998 | Ohmori | |
| 5,813,009 A | 9/1998 | Johnson et al. | |
| 5,870,523 A | 2/1999 | Kikuchi et al. | |
| 5,915,263 A | 6/1999 | Maeda | |
| 5,930,450 A | 7/1999 | Fujita et al. | |
| 5,949,955 A | 9/1999 | Nakai et al. | |
| 5,956,457 A | 9/1999 | Hirayama et al. | |
| 5,963,704 A | 10/1999 | Mimura et al. | |
| 5,978,812 A | 11/1999 | Inokuchi et al. | |
| 6,067,400 A | 5/2000 | Saeki et al. | |
| 6,078,727 A * | 6/2000 | Saeki et al. | 386/125 |
| 6,108,281 A | 8/2000 | Tozaki et al. | |
| 6,122,436 A | 9/2000 | Okada et al. | |
| 6,144,969 A | 11/2000 | Inokuchi et al. | |
| 6,160,952 A | 12/2000 | Mimura et al. | |
| 6,243,353 B1 | 6/2001 | Nozaki et al. | |
| 6,246,401 B1 | 6/2001 | Setogawa et al. | |
| 6,301,587 B1 | 10/2001 | Kim et al. | |
| 6,308,005 B1 | 10/2001 | Ando et al. | |
| 6,339,672 B1 | 1/2002 | Ando et al. | |
| 6,339,674 B1 | 1/2002 | Ando et al. | |
| 6,341,196 B1 | 1/2002 | Ando et al. | |
| 6,341,197 B1 | 1/2002 | Ando et al. | |
| 6,353,702 B1 | 3/2002 | Ando et al. | |
| 6,356,706 B1 | 3/2002 | Ando et al. | |
| 6,631,387 B2 * | 10/2003 | Kim et al. | 707/205 |
| 6,895,171 B1 | 5/2005 | Taira et al. | |
| 7,113,694 B2 * | 9/2006 | Kim et al. | 386/95 |

FOREIGN PATENT DOCUMENTS

| | | |
|---|---|---|
| JP | 09-213013 | 8/1997 |
| JP | 09-298718 | 11/1997 |

* cited by examiner

FIG. 1

| Video Manager Information (VMGI) | Video Manager Information Management Table (VMGI_MAT) | RTRWI_EA |
| --- | --- | --- |
| | | VMGI_EA |
| | | ........ |
| | Play List Search Pointer Table (PL_SRPT) | |
| Movie AV File Information Table (M_AVFIT) | Movie AV File Information Table Information (M_AVFITI) | M_AVFIT_EA |
| | | ........ |
| | Movie AV File Information (M_AVFI) | |
| Still Picture AV File Information Table (S_AVFIT) | Still Picture AV File Information Table Informastion (S_AVFITI) | S_AVFIT_EA |
| | | ........ |
| | Still Picture AV File Information (S_AVFI) | |
| Original PGC Information Table (ORG_PGCIT) | Original PGC Information Table Information (ORG_PGCITI) | ORG_PGCIT_EA |
| | | ........ |
| | Original PGC Search Pointer (ORG_PGCI_SRP) | |
| | Original PGC Information (ORG_PGCI) | |
| User Defined PGC Information Table (UD_PGCIT) | User Defined PGC Information Table Information (UD_PGCITI) | UD_PGCIT_EA |
| | | ........ |
| | User Defined PGC Search Pointer #i (UD_PGCI_SRP#i) | |
| | User Defined PGC Information (UD_PGCI#i) | |
| Text Data Manager (TXT_DT_MG) | Text Data Information (TXTDTI) | TXT_DT_MG_EA |
| | | ........ |
| | Item Text Search Pointer #i (IT_TXT_SRP#i) | |
| | Item Text #i (IT_TXT#i) | |
| Manufacturer's Information Table (MNFIT) | Manufacturer's Information Table Information (MNFITI) | MNFIT_EA |
| | | ........ |
| | Manufacturer's Information Search Pointer #i (MNFI_SPR #i) | |
| | Manufacturer's Information #i (MNFI#i) | |

*Conventional Art*

FIG. 2

| VMGI_MAT | VMG_ID |
| | RTRWI_EA |
| | VMGI_EA |
| | VERN |

*Conventional Art*

FIG. 3

*Conventional Art*

FIG. 4A

*Conventional Art*

FIG. 4B

*Conventional Art*

METHOD FOR CREATING AND MANAGING NAVIGATION INFORMATION IN A REWRITABLE RECORDING MEDIUM

This is a continuation of application Ser. No. 09/846,802 filed Apr. 30, 2001, now U.S. Pat. No. 6,631,387 which is a continuation of Ser. No. 09/245,857 filed Feb. 8, 1999, now issued as U.S. Pat. No. 6,301,587 on Oct. 9, 2001, and which application is hereby incorporated by reference in its entirety.

BACKGROUND OF THE INVENTION

1. Field of the Invention

The present invention relates generally to rewritable recording media, and more particularly, to an efficient management method of navigation information on a rewritable recording medium which are referred to when data on the recording medium are edited and reproduced or data are recorded to the recording medium.

2. Description of the Related Art

Optical discs have come into wide use since the advent of compact disc (CD) and the demand for optical discs is expected to grow steadily with popularization of digital versatile disc (DVD). Optical discs include read-only discs such as CD-ROM and DVD-ROM, write-once discs such as CD-R and DVD-R, and rewritable discs such as CD-RW and DVD-RAM. The specification of DVD-RTRW, which is standard writing/reading format of a rewritable disc, has not released yet and standardization for DVD-RTRW is in progress.

As rewritable optical discs like DVD-RAM are of immensely large capacity, users may store a variety of data such as moving pictures, still pictures, audio data, and the like on a single recording medium. Each time a new data file is recorded on a rewritable recording medium, navigation information for locating the data file after the recording is created and recorded along with the data file on the recording medium. The recorded navigation information is referred to whenever the relevant data file is accessed.

Figure 1:
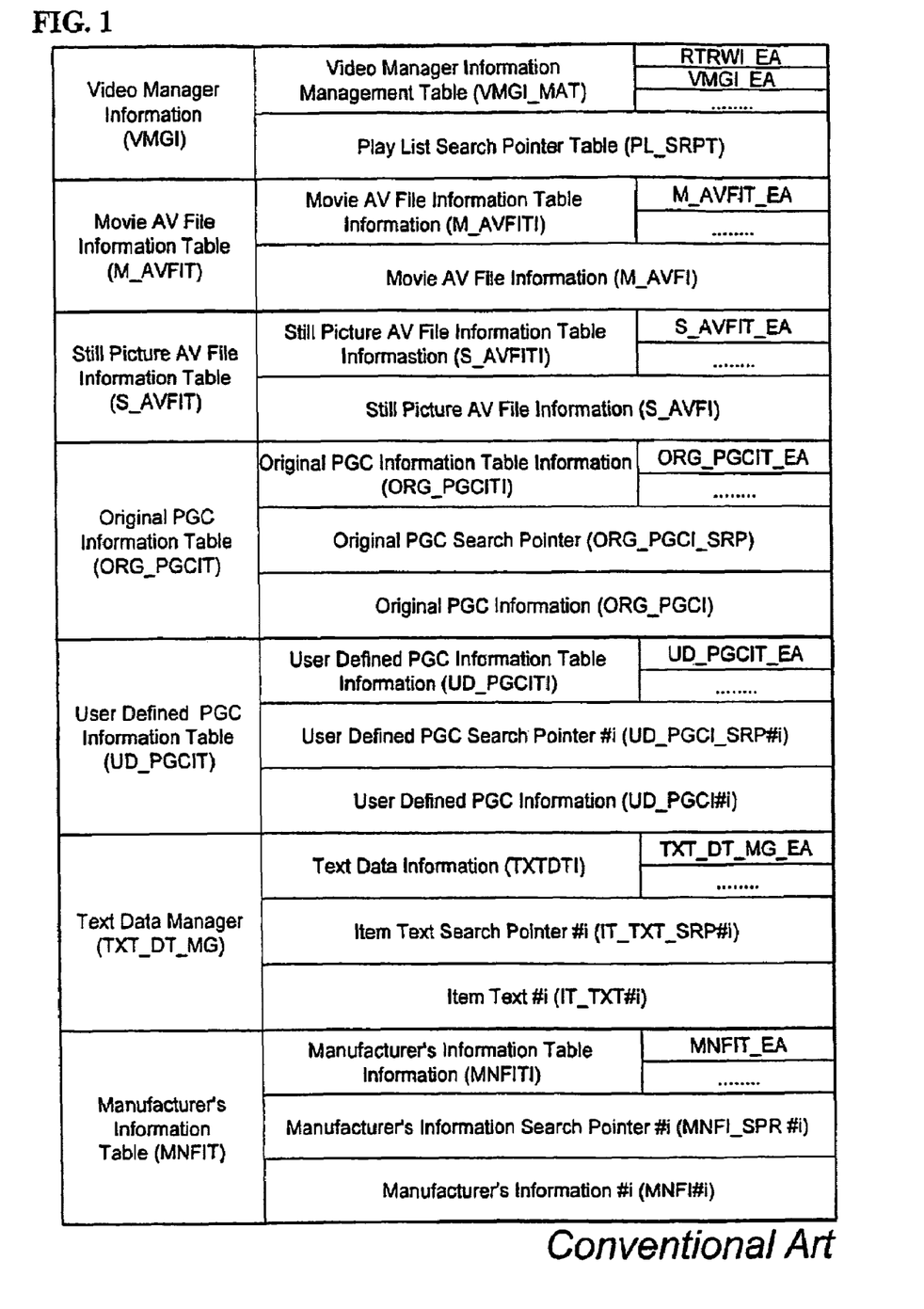
FIG. 1 is a table showing the navigation data file for managing data recorded on a rewritable recording medium.

Navigation information regarding all data files stored on a recording medium is contained in a navigation data table as shown in FIG. 1, which is recorded as a single data file on the recording medium. Accessing the recording medium entails loading the navigation data file into a memory, wherein the navigation data reside all the time. When recording a moving or still picture on the recording medium, the area in which the picture file will be recorded is determined with reference to the navigation information. Recording a picture file always accompanies creating management information regarding the recorded picture file and updating the navigation data file to include the newly created management information.

Figure 3:
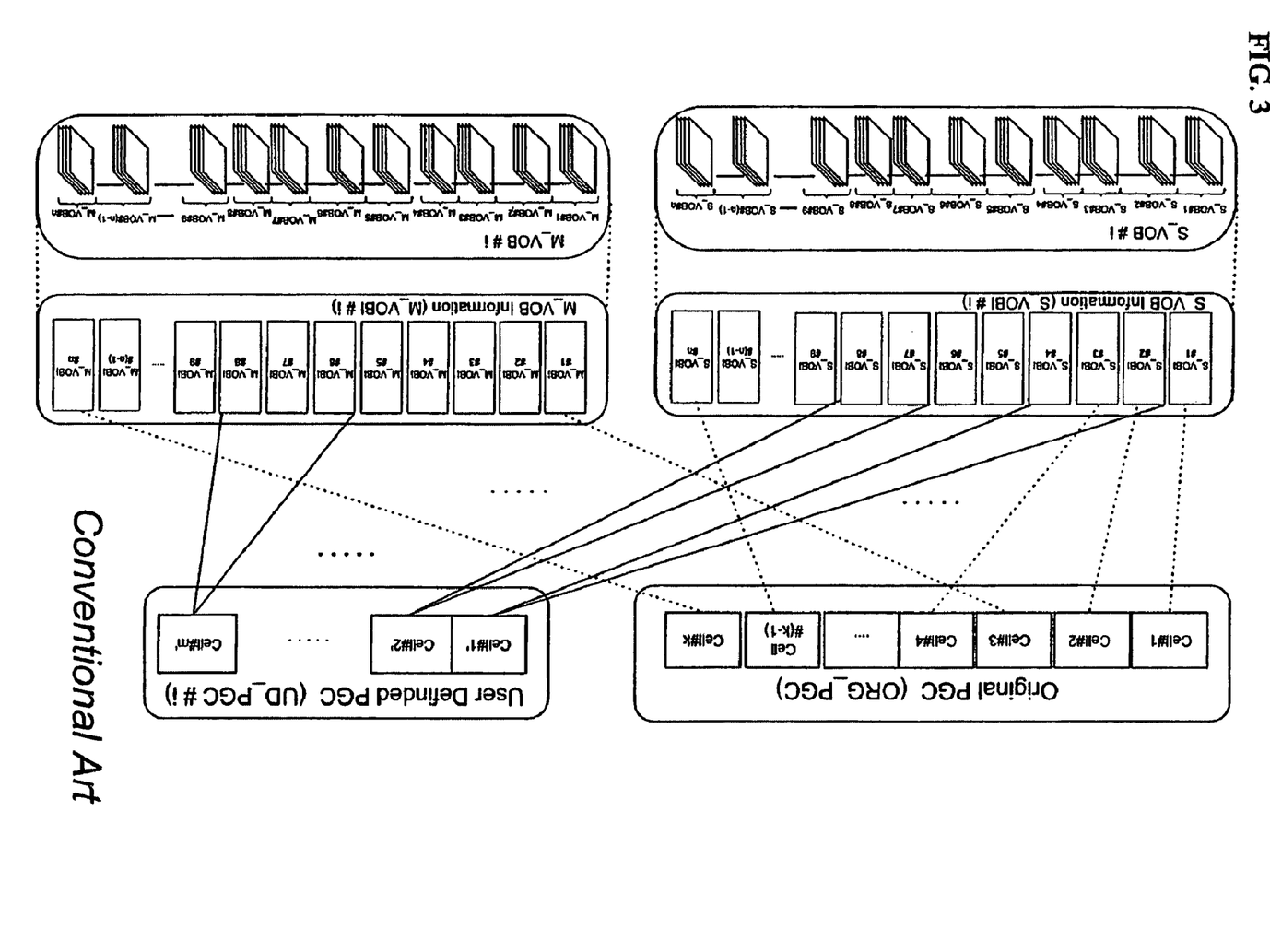
FIG. 3 is a schematic diagram explaining the mechanism of creating and handling management information in the navigation data file of FIG. 1 during recording, editing, and reproduction of moving or still pictures.

Navigation data pertaining to moving pictures comprise movie video object information (M_VOBI) and movie video object presentation order information (movie Cell Information or simply CI). Suppose that a moving picture file is composed of n movie video objects (M_VOBs), e.g., M_VOB#1~M_VOB#n as shown in FIG. 3. Since each M_VOB needs a M_VOBI and a CI, n M_VOBIs and n CIs are created in the same order that n M_VOBs are recorded. In FIG. 3, M_VOBI#1~M_VOBI#n correspond to M_VOB#1~M_VOB#n and C#3, . . . , C#k (shaded cells in the box labeled ORG_PGC) correspond to M_VOB#1~M_VOB#n. The created M_VOBIs and CIs are stored in the movie A/V file information table (M_AVFIT) and the original program chain information table (ORG_PGCIT) of the navigation data shown in FIG. 1, respectively.

On the other hand, navigation data pertaining to still pictures comprise still picture video object information (S_VOBI) and still picture video object presentation order information (still picture Cell Information or simply CI). Suppose that a still picture file is composed of n still picture video objects (S_VOBs) S_VOB#1~S_VOB#n as shown in FIG. 3. Since each S_VOB needs a S_VOBI and a CI, n S_VOBIs and n CIs are created in the same order that n S_VOBs are recorded. In FIG. 3, S_VOBI#1~S_VOBI#n correspond to S_VOB#1~S_VOB#n and C#1, C#2, C#4, . . . , C#(k–1) (not shaded Cells in the box labeled ORG_PGC) correspond to S_VOB#1~S_VOB#n. The created S_VOBIs and CIs are stored in the still picture A/V file information table (S_AVFIT) and the original program chain information table (ORG_PGCIT) of the navigation data shown in FIG. 1, respectively.

When the rewritable recording medium is accessed for reproduction, the navigation data file is read out from the recording medium and loaded into a memory. If reproduction of a moving picture (still picture) is requested, M_VOBIs (S_VOBIs) and CIs relevant to the requested moving picture file (still picture file) are read from the M_AVFIT (S_AVFIT) and ORG_PGCIT of the navigation data table, respectively. With reference to the M_VOBIs (S_VOBIs) and CIs, the requested moving picture file (still picture file) can be located from the recording medium and reproduced.

The navigation data file is used in the same manner when a moving or still picture files recorded on the recording medium is edited. If a user edits a play list of moving or still pictures to reproduce them in a preferred order, management data regarding the changed play list are created with reference to the navigation data loaded into the memory. The management data consist of a new series of CIs corresponding to the selected pictures, e.g., C#1'~C#m' of FIG. 3, which forms a user-defined PGC (UD_PGC) to be stored in the user-defined PGC information (UD_PGCI) of the UD_PGCIT shown in FIG. 1. UD_PGC#i is stored in UD_PGCI#i (i=1,2, . . . , n). If reproduction of the edited play list of the picture files is requested, the UD_PGC stored in the UD_PGCI corresponding to the requested play list is read from the UD_PGCIT of the navigation data in the memory. Then, the M_VOBIs and S_VOBIs corresponding to the CIs in the UD_PGC can be read from the M_AVFIT and S_AVFIT. For example, in FIG. 3, S_VOBI#2~S_VOBI#4, S_VOBI#7~S_VOBI#8, . . . , M_VOBI#6 ~M_VOBI#8 are read out. Finally, the VOBS linked to the play list can be read out and the play list can be reproduced in reference to the VOBIs and CIs.

Figure 2:
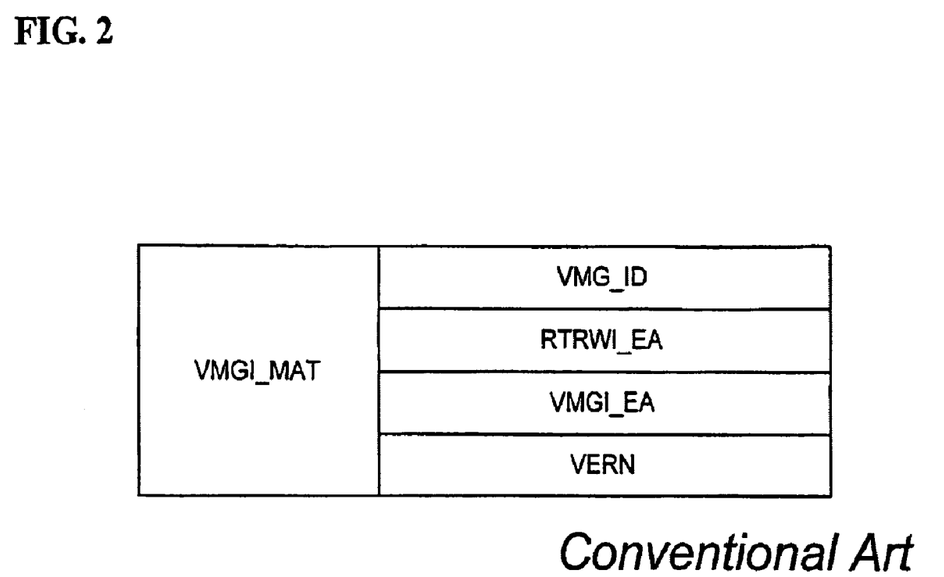
FIG. 2 is a table showing the prior configuration of the video manager information table (VGMI_MAT) shown in FIG. 1.

In the navigation data configured as above, video manager information management table (VMGI_MAT) comprises, as shown in FIG. 2, a video manager identifier (VMG_ID) for representing a navigation data file; an address (RTRWI_EA) for specifying the end address of the navigation data table which is represented by a relative logical block number from the beginning of the table; an address (VGMI_EA) for specifying the end address of the video manager information (VGMI) which is represented by a relative byte number from the beginning of the VGMI; and a version number (VERN) of the rewritable recording medium.

As shown in FIG. 1, each information table has an address field which indicates the end address of the information table: M_AVFIT_EA in movie A/V file information table information (M_AVFITI) specifies the end of M_AVFIT, S_AVFIT_EA in still picture A/V file information table information (S_AVFITI) for S_AVFIT, ORG_PGCIT_EA in original PGC information table information (ORG_PGCITI) for ORG_PGCIT, UD_PGCI_EA in user-defined PGC information table information (UD_PGCITI) for UD_PGCIT, TXT_DT_MG_EA in text data information (TXTDTI) for text data manager (TXT_DT_MG), and MNFIT_EA in manufacturer's information table information (MNFINI) for manufacturer's information table (MNFIT).

For example, in order to access original PGC information (ORG_PGCI) of the navigation data of FIG. 1, first, the end address of VMGI, or VMGI_EA is read out from VMGI_MAT of VMGI. M_AVFIT is located in reference to the VMGI_EA because M_AVFIT is the next information table of VMGI. Then, M_AVFIT_EA is read out from M_AVFITI of M_AVFIT. In the same way, S_AVFIT_EA is obtained from S_AVFINI of S_AVFIT in reference to the M_AV_FIT_EA, and then the ORG_PGCI is accessed by referencing the next address of the S_AVFIT_EA.

Therefore, the navigation data file structure, where the end addresses for the information tables such as VMGI_EA, M_AVFIT_EA, S_AVFIT_EA, ORG_PGCIT_EA, UD_PGCIT_EA, TXT_DT_MG_EA, and MNFIT_EA are used for locating, must be loaded on a memory in such a way that the information tables such as VMGI, M_AVFIT, S_AVFIT, ORG_PGCIT, UD_PGCIT, TXT_DT_MG, and MNFIT are arranged contiguously in order to access each information table appropriately.

Figure 4A:
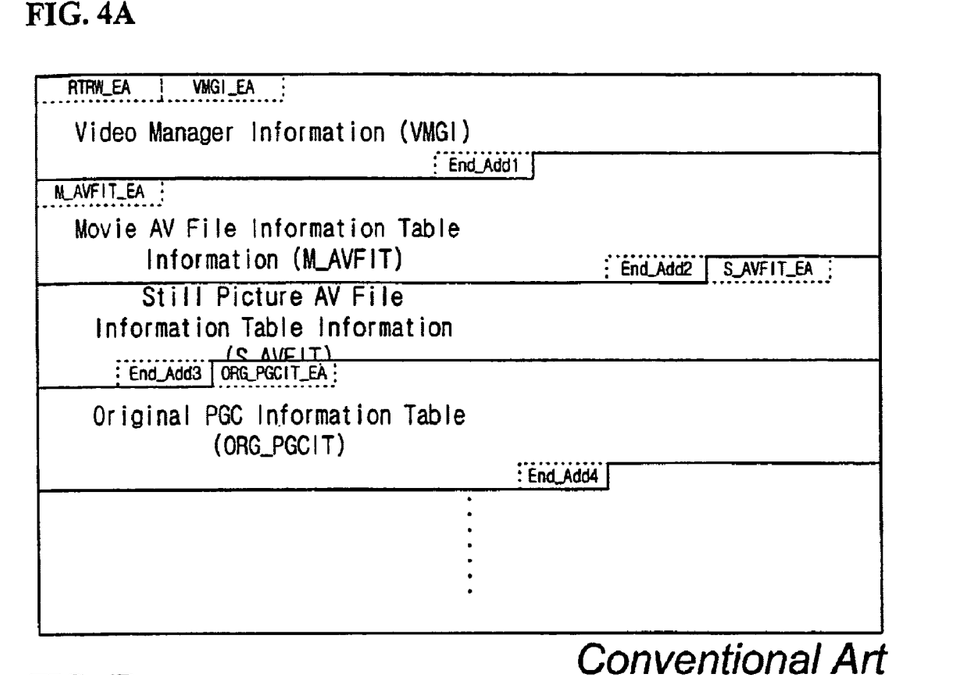
FIGS. 4A and 4B are schematic diagrams illustrating the process of writing video object information and video object presentation order information, which are created by writing of the data to the rewritable recording medium, to information tables in the navigation data file of the prior art.
Figure 4B:
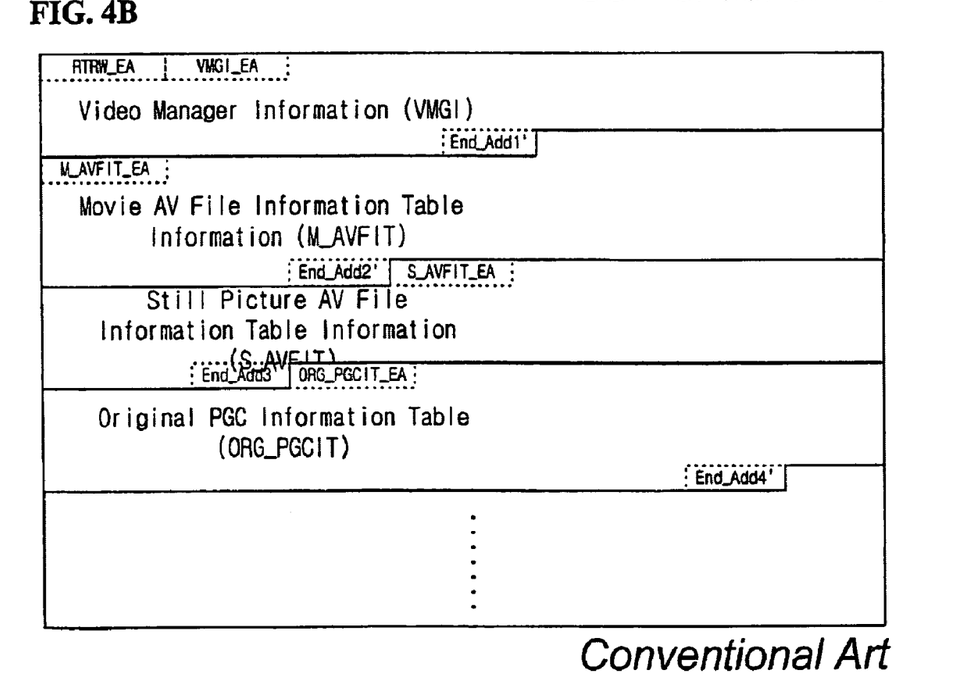

In addition, when some data, for example, moving pictures are written to the rewritable recording medium, M_VOBI#i and C#i are generated corresponding to the M_VOB#i to be recorded newly and are then written to M_AVFIT and ORG_PGCIT, respectively. Since the information tables of the navigation data are arranged on the memory contiguously, as shown in FIG. 4A, writing the generated M_VOBI#i into M_AVFIT requires that information tables after the M_AVFIT be moved back by the size of the M_VOBI#i (shaded area in M_AVFIT in FIG. 4B), as shown in FIG. 4B. After writing the M_VOBI#i is completed, the end addresses of the M_AVFIT and information tables thereafter are updated. Likewise, in order to write the C#i into ORG_PGCIT, it is required that information tables positioned after the ORG_PGCIT are moved back by the size of the C#i (shaded area in ORG_PGCIT in FIG. 4B). Writing the C#i into ORG_PGCIT is followed by updating the end addresses of ORG_PGCIT and information tables thereafter.

In other words, in the prior navigation data file structure, it takes more reading-and-writing cycle of information tables on the memory to write management information, which are generated when data are written to a rewritable recording medium, to the navigation data. As a result, updating management data requires more time for memory operation.

Because, in the prior navigation data file structure, access to the information tables in the navigation data such as M_AVFIT, S_AVFIT, ORG_PGCIT, UD_PGCIT, TXT_DT_MG, and MNFIT is made through a series of referencing the end addresses of preceding information tables, the access time is rather long and thereby it may be a burden to real-time operation for writing/reproducing data to/from the rewritable recording medium.

SUMMARY OF THE INVENTION

It is therefore a primary object of the present invention to provide an effective method of managing navigation data, which are referred to when data on the recording medium are edited and reproduced, or data are recorded to the recording medium, by offering a new navigation data structure in which direct access to information tables in the navigation data is enabled.

The method of managing the navigation data for the rewritable recording medium according to the present invention is characterized in that it comprises steps of writing management information, which is asked to be updated due to writing/editing data or change of presentation order, to the relevant information tables in the navigation data; checking whether or not the adjustment of positions of the information tables on the navigation data is required to write the relevant management information; and altering the start locations of the information tables whose locations are to be adjusted, according to the examination result.

The management method of the navigation data according to the present invention is further characterized in that it comprises steps of loading the navigation data recorded on the rewritable recording medium onto a memory; generating management data depending on the data type and the type of presentation control, when recording, reproduction, or editing is requested; reading the start address information of the information tables, which are relevant to the generated management data, from the navigation data on the memory; and writing the generated management data to an appropriate location of each of the relevant information tables based on the start address information.

DETAILED DESCRIPTION OF THE PREFERRED EMBODIMENT

The preferred embodiment of the present invention will be described in detail referring to the accompanying drawings.

Figure 5:
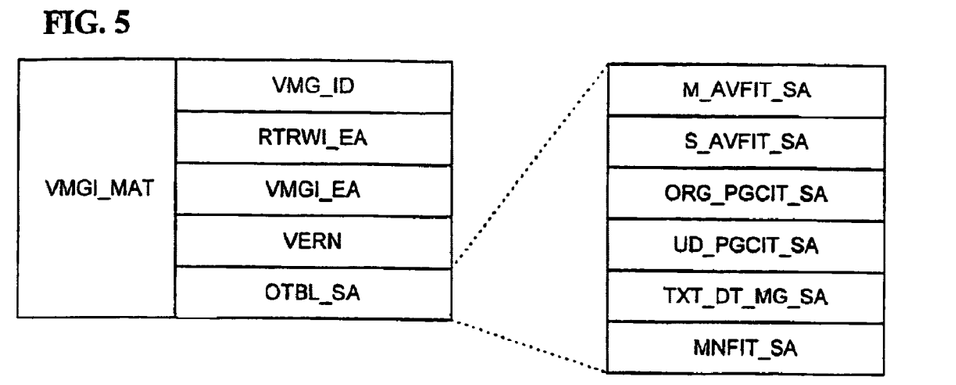
FIG. 5 is a configuration of the video manager information table (VMGI_MAT) according to the present invention.

FIG. 5 depicts an embodiment of the VMGI_MAT of the navigation file structure for a rewritable recording medium in accordance with the present invention. The VMGI_MAT differs from the prior VMGI_MAT of FIG. 2 in that, besides VMG_ID, RTRWI_EA, VMGI_EA, and VERN, it further includes an additional field, OTBL_SA where start addresses of the information tables except VMGI_MAT, i.e., M_AVFIT, S_AVFIT, ORG_PGCIT, UD_PGCIT, TXT_DT_MG, and MNFIT are stored. The start addresses are denoted by M_AVFIT_SA (for M_AVFIT), S_AVFIT_SA (for S_AVFIT), ORG_PGCIT_SA (for ORG_PGCIT), UD_PGCIT_SA (for UD_PGCIT), TXT_DT_MG_SA (for TXT_DT_MG), and MNFIT_SA (for MNFIT), respectively.

Each start address may be represented by a relative byte number from the beginning of the navigation data table of FIG. 1.

In the navigation data file configured as above, each information table can be accessed by only reading out its own start address from the OTBL_SA of the first information table or VMGI_MAT, and referencing the address.

Figure 6:
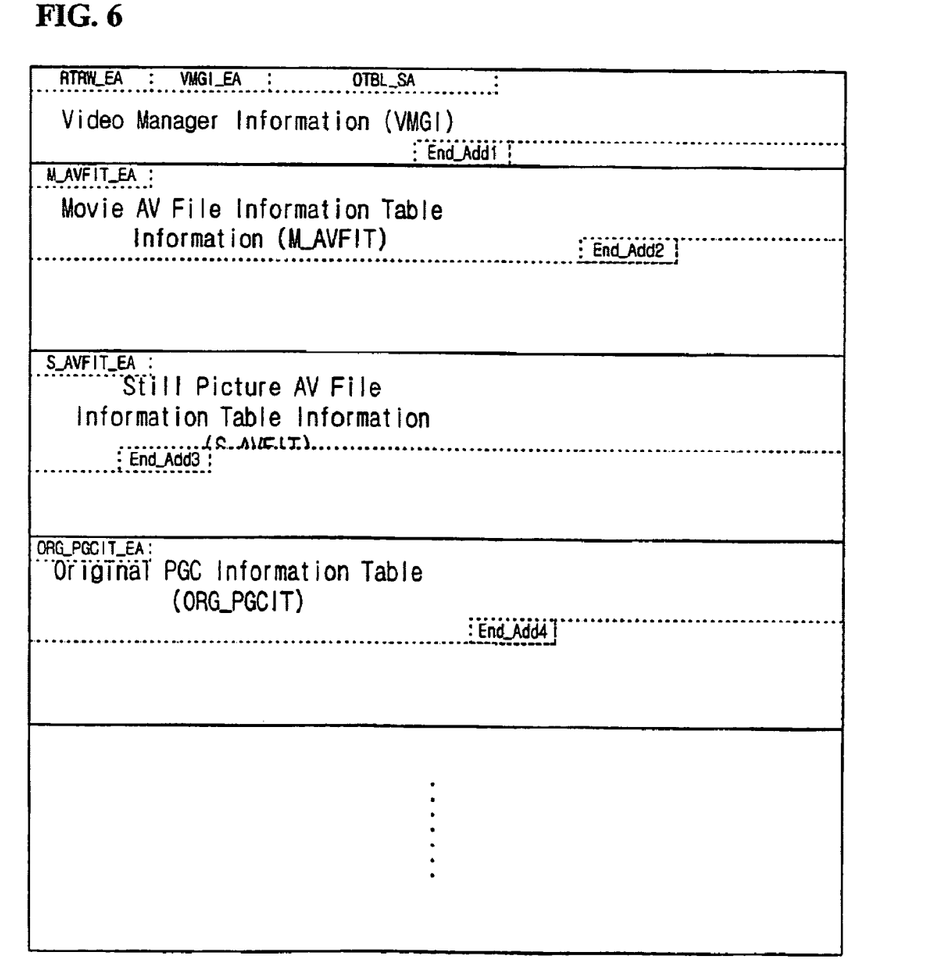
FIG. 6 is a schematic diagram illustrating the process of writing video object information and video object presentation order information to information tables of the navigation data file having a structure according to the present invention.

Thus, each information table need not to be arranged contiguously on the memory or the recording medium, as in the prior navigation data structure. For example, the start addresses kept in the OTBL_SA of VMGI_MAT can be chosen such that the information tables in the navigation data are arranged apart to each other with a predetermined spacing (shaded area in each information table of FIG. 6), as shown in FIG. 6. In this case, it is possible to write data into one or more of the information tables without moving back the information tables thereafter in order to make sufficient area for the data. The navigation data structure according to the present invention includes the prior navigation data structure. That is, the start addresses may be set such that the information tables are positioned contiguously, where when writing data into information table(s) in the navigation data, it is inevitable to move back the information tables which follows the information table (s), as in the prior navigation data structure. In the case, however, it requires no manipulation of the end addresses of the preceding information tables to access the information tables to be moved.

Figure 7:
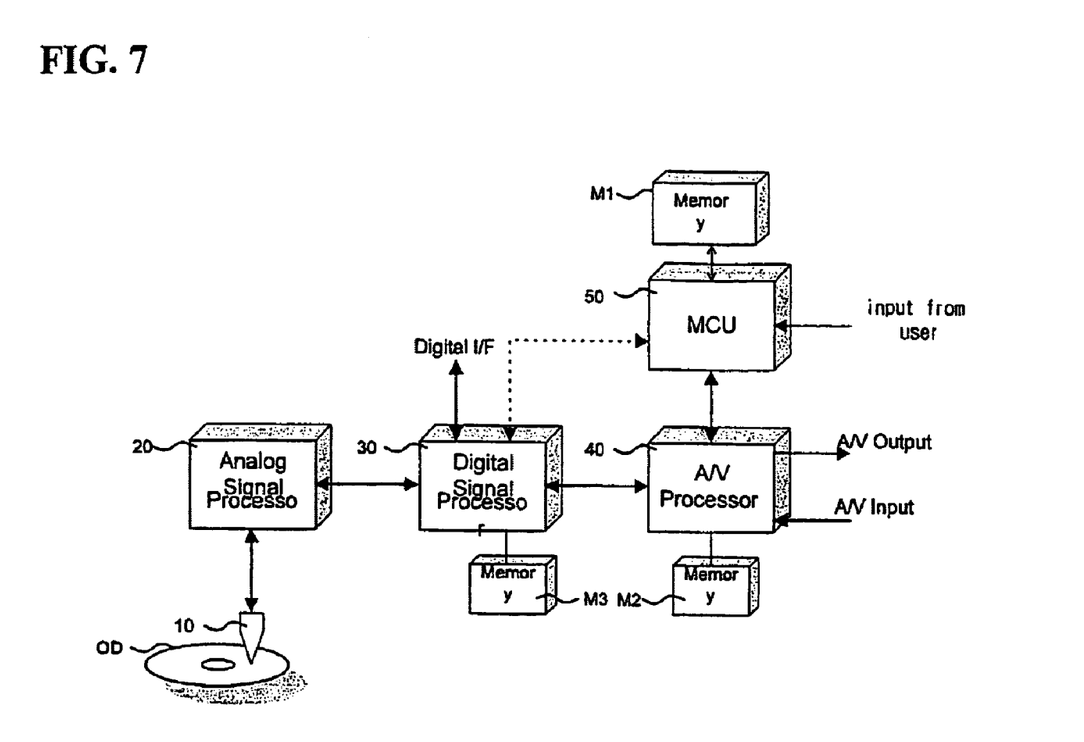
FIG. 7 is a schematic diagram of an optical disc recording/reproduction apparatus embodying the present invention.

The player comprises an optical pickup 10 for writing/reading information to/from an optical recording medium; an analog signal processing unit 20 for filtering and digitizing high-frequency analog signals reproduced from the recording medium and converting digital data to be recorded on the recording medium into analog signals; a digital signal processing unit 30 for decoding and encoding digital data and yielding a control signal for data synchronism; an A/V data processing unit 40 for decoding audio/video input data, hereinafter referred to simply as A/V data and encoding audio/video input signals into A/V data; a control unit 50 for controlling general operation of the player in response to a user's requests; and a plurality of memories M1, M2, and M3 for storing temporary data created in each signal processing step. The navigation data file is loaded into the memory M1.

When recording a moving or still picture on the recording medium in the player of FIG. 7, first, the control unit 50 loads the navigation data file recorded on the recording medium into the memory M1. Referring to the loaded navigation data, the control unit 50 records the picture data on the recording medium, creates management information composed of M_VOBIs or S_VOBIs and CIs corresponding to the VOBs forming the picture file, and writing the management information into the navigation data on the memory M1.

To be specific, in case where moving pictures are written to the recording medium, the control unit 50 generates a series of M_VOBIs, i.e., M_VOBI#1~M_VOBI#n in FIG. 3, corresponding to a series of M_VOBs to be written, i.e., M_VOB#1~M_VOB#n in FIG. 3. Then, the control unit 50 reads out the start address of M_AVFIT, or M_AVFIT_SA from VMGI_MAT of VMGI in the navigation data, and then writes the generated M_VOBIs sequentially into M_AVFI of M_AVFIT which is accessed in reference to the M_AVFIT_SA. And, a series of CIs, i.e., C#3, . . . , C#k in FIG. 3, each corresponding to each of the M_VOB#i, is generated by the control unit 50. ORG_PGCIT is accessed by reading the start address of ORG_PGCIT or ORG_PGCIT_SA from VMGI_MAT, and then the series of CIs is written sequentially into ORG_PGCI of the ORG_PGCIT.

The procedure for writing still pictures to the recording medium is similar to that for writing moving pictures. The control unit 50 generates a series of S_VOBIs, i.e., S_VOBI#1~S_VOBI#n in FIG. 3, corresponding to the series of S_VOBs to be written, i.e., S_VOB#1~S_VOB#n in FIG. 3. Then, the control unit 50 reads out the start address of S_AVFIT, or S_AVFIT_SA from the VMGI_MAT of VMGI in the navigation data, and then writes the generated S_VOBIs sequentially into S_AVFI of S_AVFIT which is accessed in reference to the S_AVFIT_SA. And, a series of CIs, i.e., C#1, C#2, . . . , C#(k−1) in FIG. 3, each corresponding to each of the S_VOB#i, is generated by the control unit 50. ORG_PGCIT is accessed by using the start address of ORG_PGCIT or ORG_PGCIT_SA which is kept in VMGI_MAT, and then the series of CIs is written sequentially into ORG_PGCI of the ORG_PGCIT.

When writing moving or still pictures to the recording medium, it is necessary that the control unit 50 checks whether or not information tables related to the moving or still pictures have their own reserved writing area enough to contain the corresponding management information. This is because, even though each information table can have its own some reserved area initially in the navigation data structure, as shown in FIG. 6, the reserved areas become insufficient as the amount of management information gets large. For every information table whose reserved area is determined to be insufficient, all information tables after the information table are moved back sequentially on the memory by a predetermined amount, and then the generated management information is written to the newly expanded writing area of the information table. In addition, because the start addresses of the moved information tables change, corresponding start addresses kept in the OTBL_SA field in VMGI_MAT of VMGI are altered.

When reproduction of moving pictures (or still pictures) recorded on the recording medium is requested, the navigation data file on the recording medium is, first, loaded onto the memory M1. The control unit 50 accesses ORG_PGCIT by obtaining the start address of ORG_PGCIT, or ORG_PGCIT_SA from VMGI_MAT in the loaded navigation data, and then reads out the presentation order information corresponding to the requested VOBs from ORG_PGCI sequentially, i.e., C#1~C#k in FIG. 3. At the same time, M_VOBIs (or S_VOBIs) corresponding to the presentation order information are read out sequentially from M_AVFI (or S_AVFI) in the navigation data after accessing M_AVFIT (or S_AVFIT) by using M_AVFIT_SA (or S_AVFIT_SA) stored in VMGI_MAT. Then, the control unit 50 searches for the requested moving picture (or still picture) on the recording medium and then reproduces them in reference to the CIs and the M_VOBIs (or S_VOBIs).

On the other hand, in case where editing the presentation order of moving pictures (or still pictures) on the recording medium is asked, the navigation data file on the recording medium is loaded onto the memory M1. According to the user's editing of the presentation order of the M_VOBs (or S_VOBs) recorded on the recording medium, the control unit 50 creates a series of CIs representing the new presentation order of the M_VOBs (or S_VOBs), e.g., C#1'~C#m' shown in FIG. 3. Then, the control unit 50 accesses UD_PGCIT by referencing the start address of UD_PGCIT, or UD_PGCIT_SA and writes the new series of the CIs into UD_PGCI of UD_PGCIT. The generated CIs composes a user-defined program chain information (UD_PGC), or a play list, which represents a reproduction order of the relevant M_VOBs (or S_VOBs).

When reproduction is requested according to the edited play list after editing the presentation order, first, the start address of UD_PGCIT or UD_PGCIT_SA which is read out from VMGI_MAT of the navigation data loaded on the memory M1 is used to access the UD_PGCIT, and then the CIs corresponding to the requested play list, i.e., C#1'~C#m' in FIG. 3 is read out from the UD_PGCI of the UD_PGCIT. And, S_AVFIT and M_AVFIT are accessed in reference to S_AVFIT_SA and M_AVFIT_SA stored in VMGI_MAT, respectively. Then, the VOBs corresponding to the CIs, i.e., S_VOBI#2~S_VOBI#4, S_VOB#7~S_VOB#8, ..., M_VOBI#6~M_VOBI#8 shown in FIG. 3, are read out sequentially from the S_AVFI and M_AVFI. Based on the CIs and VOBIs, the VOBs corresponding to the requested play list are read out from the recording medium and then reproduced.

Figure 8:
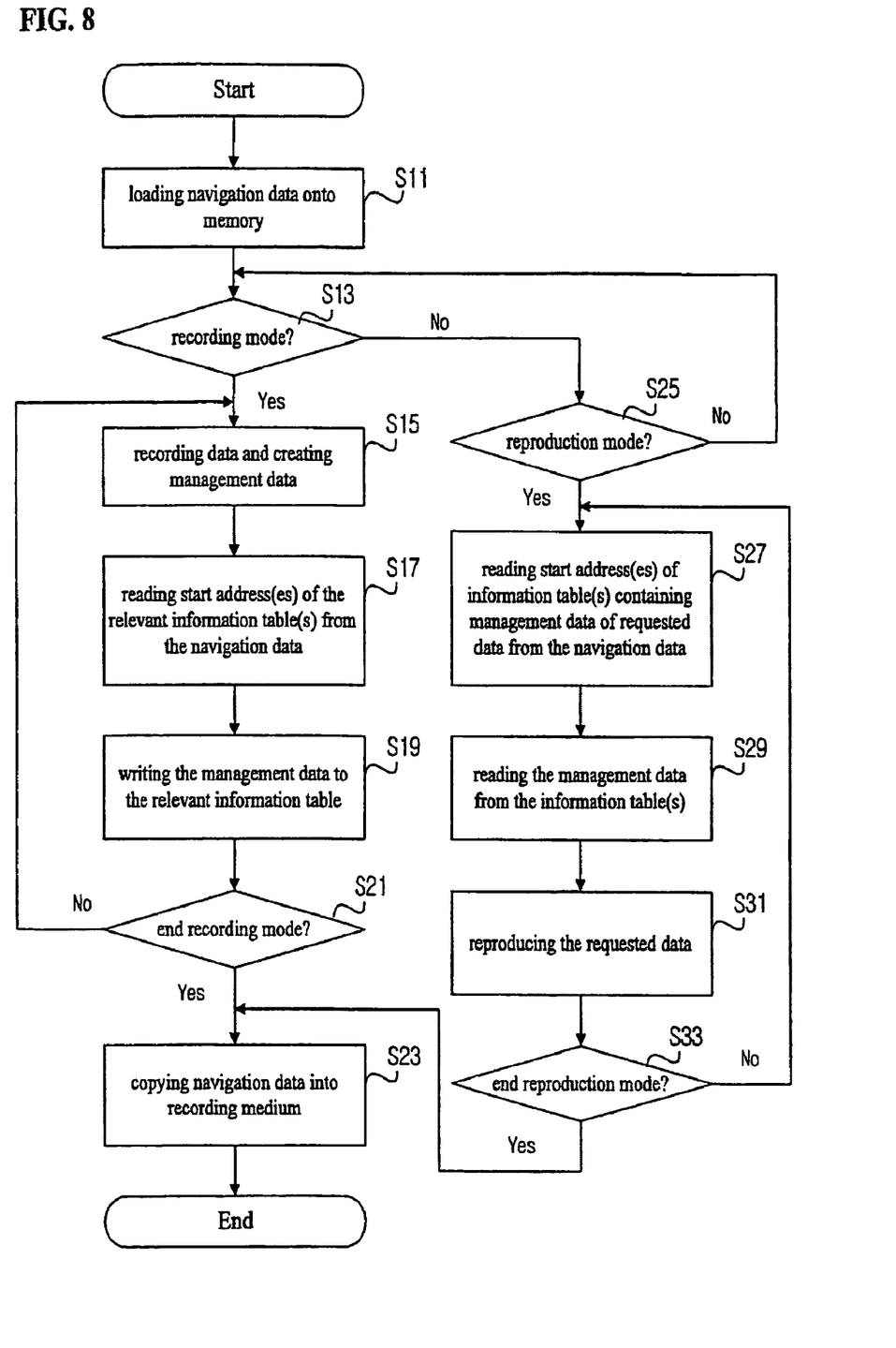
FIG. 8 is a flow chart depicting a management method of the navigation data for a rewritable recording medium according to the present invention.

The method of managing the navigation data for the rewritable recording medium according to the present invention is described below in detail with reference to the flow chart shown in FIG. 8.

If a rewritable recording medium is loaded into the player, the control unit 50 reads the navigation data file from the recording medium and stores the file in the memory M1 (S11). Then, the control unit 50 examines whether or not writing moving or still pictures is requested by a user, i.e., recording mode is set (S13). When it is determined that the player is in the recording mode, the control unit 50 begins execution of a writing control routine, and creates management data corresponding to the data which are written to the recording medium (S15). The VOBIs and CIs compose the management data when moving or still pictures are written to the recording medium. Then, the control unit 50 reads out the start addresses of the information tables, which are relevant to the generated management data, from VMGI_MAT in the navigation data loaded on the memory M1 (S17). For example, if the management data are M_VOBI and CI, M_AVFIT SA and ORG_PGCIT_SA are read out.

Then the control unit 50 accesses the relevant information tables in the navigation data table by using the start addresses obtained in the step of S17 and then writes the generated management data into the information tables (S19). For example, in case of writing moving pictures to the recording medium, M_AVFIT is accessed by using M_AVFIT_SA and then the relevant M_VOBI is written to M_AVFI of the M_AVFIT. Also, ORG_PGCIT is accessed by ORG_PGCIT_SA and then CI is written to ORG_PGCI of the ORG_PGCIT.

Once the writing management data into the navigation data is completed, the control unit 50 examines whether to end the recording mode (S21). If not, the above writing process S15 through S19 is repeated. On the other hand, when the recording mode is determined to end, the control unit 50 reads the navigation data contained in the memory M1 and writes the navigation data to the recording medium (S23), thereby completing the writing control routine.

On the other hand, if it is determined in the step of S13 that the recording mode is not set, the control unit 50 examines whether the reproduction mode is set or not (S25). If the player is in the reproduction mode, the start addresses of the information tables which are relevant to the data to be asked for reproduction are read out from the navigation data on the memory M1 (S27). By referencing the start addresses, the relevant information tables are accessed and then the management data corresponding to the requested data on the recording medium are extracted from the information tables (S29). For example, if reproduction of moving pictures is requested in a presentation order of original PGC, M_AVFIT_SA and ORG_PGCIT_SA are read out from VMGI_MAT of the navigation data, and then M_VOBI and CI are extracted the two information tables or M_AVFIT and ORG_PGCIT.

Then, the control unit 50 executes a control routine for reading out and reproducing the data recorded on the recording medium (S31). The control unit 50 examines whether or not the reproduction mode ends (S33). If not, the above reproduction process S27 through S31 is repeated. On the other hand, when it is determined that the reproduction mode ends, the control unit 50 executes the step of S23, in which the navigation data contained in the memory M1 are written to the recording medium, in order to preserve management data in the navigation data which may have been changed by editing data and/or changing presentation order in the reproduction mode, thereby completing the control routine.

Although it is primarily described in detail in the foregoing embodiment that information tables on the navigation data such as M_AVFIT, S_AVFIT, ORG_PGCIT, and UD_PGCIT are directly accessed by using the start addresses in VMGI_MAT of the navigation data, other information tables such as TXT_DT_MG and MNFIT can be accessed directly in the same way with their own start addresses such as TXT_MT_MG_SA and MNFIT_SA, respectively.

The management method of the navigation data for a rewritable recording medium according to the present invention provides a fast way of accessing each information table on the navigation data table compared to the prior art method, contributing to the real-time reproduction or writing operation. The present invention also enables to locate each information table of the navigation data table due to keeping its own start address, even if the information tables are not arranged contiguously on the memory or the recording medium. Furthermore, instead of loading all of the information tables of the navigation data table onto the memory, as in the prior art method, the present invention makes it possible to selectively load the information tables which are currently needed for the requested operation onto the memory, yielding high efficient use of the memory. In this case, each time new operation, reproduction or writing, is requested, it is checked that the information tables relevant to the requested operation are different from the information tables which have been loaded on the memory. It is preferred that the information tables are loaded on the memory only when they are different.

The foregoing is provided only for the purpose of illustration and explanation of the preferred embodiments of the present invention, so changes, variations and modifications may be made without departing from the spirit and scope of the invention.

What is claimed is:

1. A method for providing navigation information on a recording medium, the steps comprising:
   recording user data onto at least one data area of the recording medium;
   creating at least one navigation information directory on the recording medium, wherein the navigation information directory comprises sequence play list associated with the user data recorded on the recording medium and a start address information for accessing the sequence play list;
   checking whether a start address of the sequence play list has been changed; and
   changing and recording the start address information in the navigation information directory based on a result of the checking step.

2. The method of claim 1, wherein the navigation information directory is recorded as a single file.

3. The method of claim 1, wherein the sequence play list contains one of management information for reproducing data in a recording order and management information for reproducing data in a user-defined order.

4. The method of claim 1, wherein the start address information of the navigation information directory is represented by relative positional information from the beginning of the navigation information directory.

5. A recording apparatus for providing navigation information on a recording medium, the recording apparatus comprising:
   a recorder configured to record user data onto at least one data area of the recording medium; and
   a processor configured to create at least one navigation information directory on the recording medium, wherein the navigation information directory comprises sequence play list associated with the user data recorded on the recording medium and a start address information for accessing the sequence play list;
   wherein the processor is configured to further check whether a start address of the sequence play list has been changed, to change the start address information, and to control the recorder to record the changed start address information in the navigation information directory based on a result of the checking.

6. The recording apparatus of claim 5, wherein the navigation information directory is recorded as a single file.

7. The recording apparatus of claim 5, wherein the sequence play list contains one of management information for reproducing data in a recording order and management information for reproducing data in a user-defined order.

8. The recording apparatus of claim 5, wherein the start address information of the navigation information directory is represented by relative positional information from the beginning of the navigation information directory.

9. A recording medium containing computer readable instructions, the computer rewritable recording medium comprising:
   at least one data area for recording user data; and
   at least one navigation information directory comprising a sequence play list associated with the user data recorded on the recording medium and a start address for accessing the sequence play list,
   wherein the instructions include instructions to cause a processor to check whether a start address of the sequence play list has been changed, and to change and record the start address information in the navigation information directory based on a result of the checking.

10. The recording medium of claim 9, wherein the navigation information directory is recorded as a single file.

11. The recording medium of claim 9, wherein the sequence play list contains one of management information for reproducing data in a recording order and management information for reproducing data in a user-defined order.

12. The recording medium of claim 9, wherein the start addresses information of the navigation information directory is represented by relative positional information from the beginning of the navigation information directory.

13. A method for reproducing data from a recording medium, comprising the steps of:
   reading start address information in a navigation information directory, wherein the navigation information directory includes a sequence play list associated with user data recorded on the recording medium and the start address information for accessing the sequence play list;
   accessing the sequence play list based on the start address information; and
   reproducing the user data recorded on the recording medium associated with the accessed sequence play list,
   wherein the start address information in the navigation information directory is changed when a start address of the sequence play list has been changed.

14. The method of claim 13, wherein the navigation information directory is recorded on the recording medium as a single file.

15. The method of claim 13, wherein the sequence play list contains one of management information for reproducing data in a recording order and management information for reproducing data in a user-defined order.

16. The method of claim 13, wherein the start address information of the navigation information directory is represented by relative positional information from the beginning of the navigation information directory.

17. A reproducing apparatus for reproducing data from a recording medium, the reproducing apparatus comprising:
   an optical pickup configured to read data from the recording medium; and
   a processor configured to
      reproduce start address information in a navigation information directory, wherein the navigation information directory comprises a sequence play list associated with user data recorded on the recording medium and the start address information for accessing the sequence play list,
      access the sequence play list based on the start address information, and
      reproduce the user data recorded on the recording medium associated with the accessed sequence play list,
   wherein the start address information in the navigation information directory is changed when a start address of the sequence play list has been changed.

18. The reproducing apparatus of claim 17, wherein the navigation information directory is recorded as a single file.

19. The reproducing apparatus of claim 17, wherein the sequence play list contains one of management information for reproducing data in a recording order and management information for reproducing data in a user-defined order.

20. The reproducing apparatus of claim 17, wherein the start address information of the navigation information directory is represented by relative positional information from the beginning of the navigation information directory.

* * * * *